United States Patent [19]
Bennett

[11] 4,168,795
[45] Sep. 25, 1979

[54] METHOD OF WELDING A PROJECTING BRACKET TO A TANK OR THE LIKE

[75] Inventor: Moreland P. Bennett, Hickory, N.C.

[73] Assignee: General Electric Company, Philadelphia, Pa.

[21] Appl. No.: 867,863

[22] Filed: Jan. 9, 1978

[51] Int. Cl.² .................................................. B23K 28/02
[52] U.S. Cl. ...................................... 228/175; 219/93; 219/137 R; 228/178; 228/199
[58] Field of Search .............. 228/175, 178, 199, 214, 228/182; 219/87, 91.22, 93, 137 R; 29/460

[56] References Cited

U.S. PATENT DOCUMENTS

| | | | |
|---|---|---|---|
| 1,842,298 | 1/1932 | Smith | 219/137 R X |
| 1,844,407 | 2/1932 | Murray | 165/183 |
| 1,872,394 | 8/1932 | Bleicher | 219/93 |
| 1,874,415 | 8/1932 | Atwood | 219/93 X |
| 2,219,599 | 10/1940 | Penote | 228/182 |
| 3,045,340 | 7/1962 | Knolling | 228/175 |
| 3,465,420 | 9/1969 | Webb et al. | 228/199 |

Primary Examiner—Lowell A. Larson
Assistant Examiner—Kenneth J. Ramsey
Attorney, Agent, or Firm—William Freedman; Carl L. Silverman

[57] ABSTRACT

A bracket of generally U-shaped cross-section comprising spaced-apart legs terminating in edges having projections thereon is joined to a cylindrical steel wall by a method that comprises the steps of: (a) locating the bracket so that said edges extend along the length of the cylindrical steel wall and said projections contact the external surface of the wall, (b) projection-welding the bracket to the wall by an operation that collapses the projections, locates the edges closely adjacent the external surface of the steel wall, and provides a gap of V-shaped cross-section between each edge and the external surface of the wall, and (c) then fillet-welding the bracket to the wall by applying a welding fillet to the external surface of the wall and the outer surface of each leg of the bracket in the region of the V-shaped gap.

8 Claims, 6 Drawing Figures

U.S. Patent    Sep. 25, 1979    4,168,795
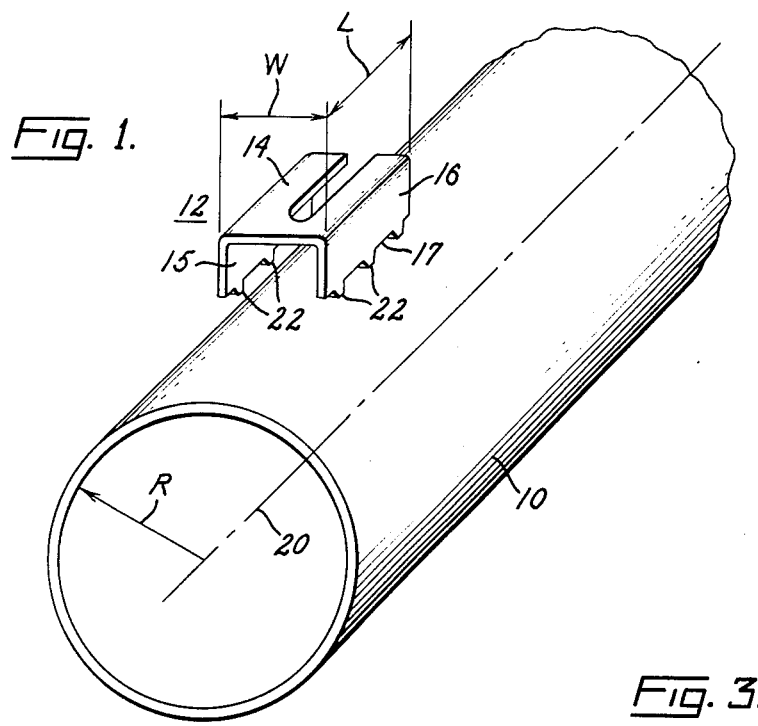
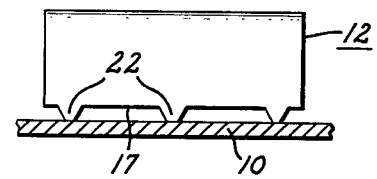
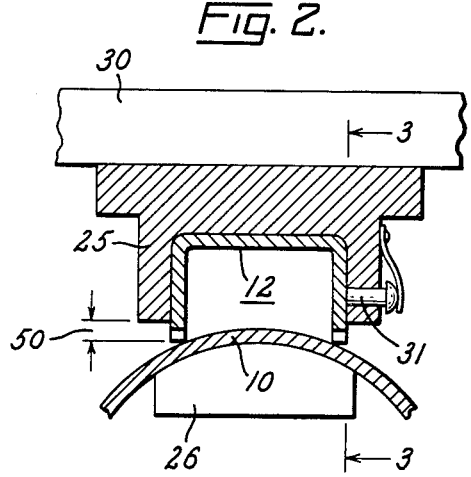
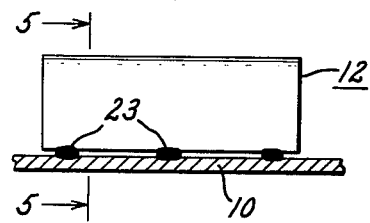
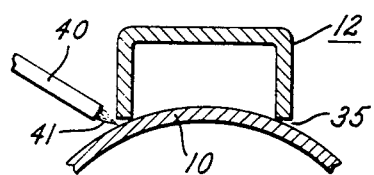
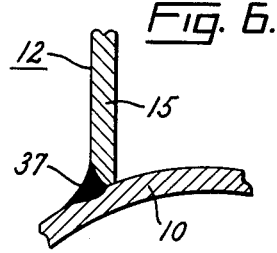

METHOD OF WELDING A PROJECTING BRACKET TO A TANK OR THE LIKE

BACKGROUND

This invention relates to a method of welding to the exterior of a metal tank or similar body, a projecting metal part, such as a supporting bracket for the tank, and, more particularly, relates to a welding method which: (a) lends itself to use with a supporting bracket of an inexpensive design and (b) produces a high strength joint that requires no additional material other than paint to effectively resist joint-corrosion. The invention also relates to a joint made by this method.

My invention is especially applicable to electrical apparatus which comprises a cylindrical steel tank and a steel supporting bracket of U-shaped cross-section welded to the exterior of the tank for supporting the tank in an outdoor location where corrosion at the welded joint can be a problem. A typical U-shaped bracket for such applications comprises spaced-apart legs projecting generally radially toward the tank wall and flanges at the inner ends of legs that conform in shape to the exterior surface of the tank and are projection welded to the tank wall. To project such welded joints from corrosion, a number of different procedures have been used. For example, the parts have sometimes been plated, or special sealants have been provided around the entire outer perimeter of each flange, or an arc weld has been applied around this perimeter for sealing and reinforcing purposes. In some cases, paint alone has been provided around the perimeter of each flange, but this approach has not been as reliable as might be desired since this necessitates relying upon the projection welds alone for providing the mechanical strength of the joint and, moreover, there may sometimes be insufficient conformity between the flange surface and the juxtaposed tank surface for the paint to provide an effective and durable steel between these surfaces.

Another disadvantage of the above-described methods is that they require flanges at the inner ends of the bracket legs and, particularly, flanges of a shape to conform with the tank exterior. Such flanges are relatively expensive since their presence necessitates extra material and extra forming steps.

SUMMARY

Accordingly, an object of my invention is to provide a welding method which requires no such flanges on the bracket and which produces a high strength joint which, when painted in a conventional manner, is able to effectively resist corrosion without reliance upon special crevice sealers.

Another object is to provide a welding method of the above type which relies upon arc welding but required no clamps or fixtures for properly positioning the bracket on the cylindrical body during such arc welding.

Another object is to provide between a bracket of generally U-shaped cross-section and the external wall of a generally cylindrical body a high-strength welded joint requiring no flanges on the bracket and able, when painted in a conventional manner, to effectively resist joint corrosion in an outdoor environment.

In carrying out the invention in one form, a bracket of generally U-shaped cross-section comprising spaced-apart legs terminating in edges having projections thereon is joined to a cylindrical steel wall by a method that comprises the steps of: (a) locating the bracket so that said edges extend along the length of the cylindrical steel wall and said projections contact the external surface of the wall, (b) projection-welding the bracket to the wall by an operation that collapses the projections, locates the edges closely adjacent the external surface of the steel wall, and provides a gap of V-shaped cross-section between each edge and the external surface of the wall, and (c) then fillet-welding the bracket to the wall by applying a welding fillet to the external surface of the wall and the outer surface of each leg of the bracket in the region of the V-shaped gap.

BRIEF DESCRIPTION OF THE DRAWINGS

For a better understanding of the invention, reference may be had to the accompanying drawings, wherein:

FIG. 1 is an exploded perspective view showing the main components that are to be joined by my method.

FIG. 2 is a cross-sectional view showing the components of FIG. 1 positioned in engagement for projection-welding. The electrodes of the projection-welder are shown in a position to initiate the projection-welding step.

FIG. 3 is a sectional view along the line 3—3 of FIG. 2, but with the electrodes omitted.

FIG. 4 is a view similar to that of FIG. 3 but after the projection-welding step has been completed.

FIG. 5 is a sectional view along the line 5—5 of FIG. 4. FIG. 5 also illustrates how the fillet-welding step is performed following the projection-welding step of FIG. 2.

FIG. 6 is an enlarged sectional view showing one of the welding fillets produced by the fillet-welding step.

DETAILED DESCRIPTION OF PREFERRED EMBODIMENT

Referring now to FIG. 1, there is shown a cylindrical steel body 10 and a steel bracket 12 of U-shaped cross-section which it is desired to join by welding to the exterior of body 10. In one form of the invention, the cylindrical body 10 is a portion of the tank of a distribution-type electrical transformer, and the bracket 12 is a supporting bracket for mounting the tank on a utility pole in an outdoor location.

In the perspective view of FIG. 1, the bracket 12 is shown radially spaced from the tank prior to its being positioned for welding to the tank. The U-shaped bracket comprises a bight portion 14 and two spaced-apart legs 15 and 16 terminating in edges 17. At the edges 17 are a plurality of integral projections 22 spaced-apart along the length of each edge and intended for use in a subsequent projection-welding operation. The tank 10 has a central longitudinal axis 20, and the length of the tank is the dimension of the tank extending along this axis.

In preparation for the welding operation, the bracket 12 is positioned with its edges 17 extending along the length of the tank and its projections 22 engaging the exterior wall of the tank, as shown in FIGS. 2 and 3. The first step in the welding operation is a projection-welding step employing two welding electrodes 25 and 26. As seen in FIG. 2, welding electrode 25 has a U-shaped recess that snugly receives the bracket 12, and welding electrode 26 is positioned within the tank body in engagement with the interior surface of the tank wall and in alignment with the bracket 12. A springbiased pin 30 extending through an opening in the right leg of the electrode 25 bears firmly against the right hand side of the bracket 12 and acts to hold the left leg of electrode 25 in good electrical contact with the left-hand side of the bracket.

The bracket 12 is projection-welded to the tank wall by passing a high current between the electrodes 25 and 26 while applying a downward force to the upper electrode 25 through a welder platen 30. This high current passes through the projections 22 in a conventional manner, causing melting of the projections and the localized regions of the tank wall engaged by the projections. The net result is the formation of spaced-apart welds 23 at these localized regions and the collapse of the projections, as will be apparent from FIGS. 4 and 5. Accordingly, at the conclusion of the projection-welding operation, the edges 17 of the bracket legs 15 and 16 are closely adjacent the external surface of the tank wall, with that portion of the edge 17 at the inner surface of each leg 15 or 16 touching or virtually touching the tank wall and that portion of the edge 17 at the outer surface cf each leg (except for where the projection welds are located) being spaced from the tank by a substantial distance. (Typically, the spacing at the inner surface is between 0 and 2 mils and that at the outer surface is between 5 and 20 mils). Accordingly, as shown in FIGS. 4 and 5, there is a gap 35 of generally V-shaped cross-section at the edge of each leg extending along the length of each leg except for where the projection welds are located.

After this projection-welding operation is completed, a second welding step is performed by a conventional arc-welding process, such as gas metal arc welding, commonly referred to as MIG welding. This second welding operation is a fillet-welding type of operation in which a welding fillet 37 (shown in FIG. 6) is applied to the outer surface of each leg 15 or 16 of the bracket 12 in the region of the V-shaped gap 35. In such an operation, a welding rod such as shown at 40 in FIG. 4 is moved along the length of the bracket while an electric arc 41 surrounded by an inert gas shield is present between the end of the rod and the structure at the end of the bracket. The arc melts the end of the rod and the work structure adjacent its other terminal, causing a fillet of welding material from the rod to be deposited in the location shown in FIG. 6.

The above-described earlier projection welding operation serves in several important ways to facilitate the fillet-welding operation. First, it serves to securely and precisely locate the bracket 12 on the tank 10, thereby avoiding the need to employ any fixtures or locating devices during the fillet-welding operation. Secondly, it serves to provide the V-shaped gap 35 at the edge of each leg, and the presence of this V-shaped gap 35 contributes to a substantially stronger fillet weld by providing for deeper penetration of the weld from the outside surface of the bracket leg toward its inside surface.

With respect to the locating function, the projection welds are especially effective in holding the portion of the edge 17 at the inside surface of the bracket leg in very close, usually touching, relationship with the exterior of the tank wall along the length of the bracket. This is not an easy task to perform since the arc-welding step severely heats the bracket legs in a non-uniform manner, causing them to unevenly expand and contract, with a resultant strong tendency toward distortion of the legs. Ordinary fixtures are not nearly as effective as the spaced projection welds in holding the inner portion of the edge 17 tightly against, or very close to, the adjacent tank wall.

It is important, in locations not within the projection welds 23, to hold the inner portion of edge 17 along substantially its full length in touching, or very close, relationship to the tank wall so as to avoid developing large spaces between this portion of the bracket leg and the tank wall. Such spaces are undesirable since they interfere with obtaining good coverage of this region by a subsequently-applied paint coating (to be described).

After the fillet-welding operation, all exterior surfaces of the tank body 10 and all exposed surfaces of the bracket 12 are painted by a conventional painting operation, such as spraying. The resulting paint coating serves to protect these parts and the joint from corrosion, especially when exposed to an outdoor environment during use of the end-product equipment.

A region of special interest with respect to the paint coating is the region of the edge 17 adjacent the inner surface of each leg of the bracket. After the above-described painting operation, a fillet of paint covers this region. Such a fillet, if of a typical paint, can reliably cover a gap of only a few mils. It is therefore significant that this region in my joint is largely free of gaps greater than about 2 mils in width, as was pointed out hereinabove. I am thus able to reliably cover this region with a fillet of paint, thus providing good corrosion protection in this region merely with a paint coating and without requiring use of a special crevice sealer for this region.

By way of example and not limitation, I am listing below some typical dimensions of components that have been successfully joined by my above-described method. Bracket dimensions as viewed in FIG. 1: width W=2.88 inches; length L=4.5 inches; wall thickness=0.188 inch; projections 22 of a trapezoidal configuration with a height of 0.07 inch and bases of 0.188 inch and 0.06 inch, respectively. Tank dimensions: radius R=5 to 12 inches; wall thickness=0.060 inch to 0.120 inch.

With respect to the projection welding equipment of FIG. 2, the upper electrode 25 should be shaped so that the lower end of bracket legs 15 and 16 project out of the recess in this electrode by a "stick-out" distance 50 in the optimum range of ⅛ to ½ inch, with a maximum of about 1 inch. By keeping this "stick-out" distance relatively small, I can assure that most of the electric current entering the bracket from the electrode 25 does so adjacent the welding projections rather than at a remote point, thus reducing the power loss and voltage drop that would be present if most of the current entered through a remote point.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

I claim:

1. A method for joining a steel bracket to the external surface of a body having a generally cylindrical steel wall, the bracket being of a generally U-shaped cross-section and comprising spaced legs that terminate in edges extending along the length of the bracket, the bracket being provided with integral projections located at spaced points along the edge of each of said legs, the method comprising:

(a) locating said bracket so that said edges extend along the length of said generally cylindrical steel wall, with said projections in contact with the external surface of said wall, (b) projection-welding said bracket to said wall by forming projection welds at spaced locations in the regions of said projections by effecting melting in said regions while applying a force to said bracket that forces said edges toward said external surface of said wall, each of said edges being located at the conclusion of said projection-welding step closely adjacent said external surface of said wall with that portion of the edge that is not within said projection welds and is located at the outer surface of each leg being spaced from the external surface of the wall by a substantially greater distance than that portion of the edge not within said projection welds and located at the inner surface of said leg so that a gap of generally V-shaped cross-section is present between each edge and said external surface of said wall, and (c) then fillet-welding said bracket to said wall by applying a welding fillet to the external surface of said wall and the outer surface of each leg of the bracket in the region of said gap of V-shaped cross section.

2. The method of claim 1 in which at the conclusion of said projection-welding step, that portion of said edge that is not within the projection welds and is located at the inner surface of each leg contacts said external surface of the wall.

3. The method of claim 1 in which at the conclusion of said projection-welding step, that portion of said edge that is not within said projections welds and is located at the inner surface of each leg contacts said external surface of the wall along substantially the full length of each edge that is not within said projection welds.

4. The method of claim 1 in which at the conclusion of said projection-welding step, that portion of said edge that is not within said projection welds and is located at the inner surface of each leg is located between 0 and 2 mils from said external surface of the wall along substantially the full length of each edge that is not within said projection welds.

5. The method of claim 1 in combination with the additional step of applying a coating of paint to said bracket and the adjacent portion of said wall, the paint coating including a fillet of paint covering the inner surface of each leg at its innermost end and also covering the immediately adjacent region of the external surface of said wall.

6. The method of claim 5 in which at the conclusion of said projection-welding step, that portion of said edge that is not within the projection welds and is located at the inner surface of each leg contacts said external surface of the wall.

7. The method of claim 5 in which at the conclusion of said projection-welding step, that portion of said edge that is not within said projection welds and is located at the inner surface of each leg contacts said external surface of the wall along substantially the full length of each edge that is not within said projection welds.

8. The method of claim 5 in which at the conclusion of said projection-welding step, that portion of said edge that is not within said projection welds and is located at the inner surface of each leg is located between 0 and 2 mils from said external surface of the wall along substantially the full length of each edge that is not within said projection welds.

* * * * *